US012764426B2

(12) United States Patent
Ogino et al.

(10) Patent No.: US 12,764,426 B2
(45) Date of Patent: Oct. 13, 2026

(54) IMAGING SYSTEM, CONTROL APPARATUS, IMAGE CAPTURE APPARATUS, CONTROL METHOD, AND STORAGE MEDIUM

(71) Applicant: CANON KABUSHIKI KAISHA, Tokyo (JP)

(72) Inventors: Hiroshi Ogino, Tokyo (JP); Satoru Kobayashi, Tokyo (JP); Toshimasa Suzuki, Kanagawa (JP); Gou Yamashita, Kanagawa (JP); Ayako Furesawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/250,459

(22) Filed: Jun. 26, 2025

(65) Prior Publication Data

US 2026/0012710 A1 Jan. 8, 2026

(30) Foreign Application Priority Data

Jul. 3, 2024 (JP) ................................ 2024-107638

(51) Int. Cl.
*H04N 23/81* (2023.01)
*H04N 23/55* (2023.01)
*H04N 23/60* (2023.01)
*H04N 23/63* (2023.01)

(52) U.S. Cl.
CPC ............ *H04N 23/81* (2023.01); *H04N 23/55* (2023.01); *H04N 23/635* (2023.01); *H04N 23/64* (2023.01)

(58) Field of Classification Search
CPC ..................................................... H04N 23/81
See application file for complete search history.

(56) References Cited

U.S. PATENT DOCUMENTS

| | | | | |
|---|---|---|---|---|
| 6,108,036 | A | 8/2000 | Harada | |
| 2013/0176725 | A1 | 7/2013 | Hajjar et al. | |
| 2026/0046521 | A1 * | 2/2026 | Jeong | H04N 23/687 |
| 2026/0094242 | A1 * | 4/2026 | Franz | G06T 5/50 |
| 2026/0136086 | A1 * | 5/2026 | Inbar | H04N 23/57 |

FOREIGN PATENT DOCUMENTS

| | | | |
|---|---|---|---|
| JP | 2006080845 | A | 3/2006 |
| JP | 2024006362 | A | 1/2024 |
| WO | 2023238646 | A1 | 12/2023 |

OTHER PUBLICATIONS

European Search Report issued on Nov. 20, 2025, that issued in the corresponding European Patent Application No. 25186889.9.

* cited by examiner

*Primary Examiner* — Young Lee
(74) *Attorney, Agent, or Firm* — Cowan, Liebowitz & Latman, P.C.

(57) ABSTRACT

A control method controls operation of an image capture apparatus configured to capture an image of a display apparatus with a pixel structure. The image capture apparatus includes an imaging unit and a filter unit which is applied to the imaging unit and configured with changeable filter characteristics. The control method obtains information of an imaging condition of the image capture apparatus, outputs an estimation result of estimating whether or not moire will occur in a captured image output by the imaging unit on a basis of the information of the imaging condition, and changes the filter characteristics of the filter unit according to the estimation result.

17 Claims, 7 Drawing Sheets

IMAGING SYSTEM, CONTROL APPARATUS, IMAGE CAPTURE APPARATUS, CONTROL METHOD, AND STORAGE MEDIUM

BACKGROUND

Field of the Technology

The present disclosure relates to an imaging system, a control apparatus, an image capture apparatus, a control method, and a storage medium and particularly relates to imaging technology using a display apparatus in the background.

Description of the Related Art

Recent technology includes providing a large display apparatus such as an LED wall behind a subject and displaying a background video generated by computer graphics or the like on the display apparatus to enable the capture of video that look as if the subject is actually in the scene being displayed as the background video. One mode used in such technology includes virtual production technology.

However, since the display apparatus has a pixel structure including pixels for display (hereinafter referred to as display pixels) arranged in a grid-like pattern, moire may occur when imaging the display apparatus displaying the background image. Specifically, since the display pixels are physically separated from one another in the display apparatus, the background video may present a pattern of regular gaps when looked at locally when the background video is displayed on the display apparatus. Accordingly, in a case where such a pattern of regular gaps is imaged using an image sensor with photoelectric conversion elements (hereinafter referred to as imaging pixels) arranged in a grid-like pattern in a similar manner, moire may occur.

When moire occurs, an unnatural pattern appears in the region of the display apparatus. Thus, there is a possibility that the video obtained via image capture (hereinafter referred to as a captured video) cannot provide a viewing experience where the subject looks as if they are actually in the scene displayed as the background video. In other words, when moire occurs in the captured video, the viewer may get the impression that a video is being captured of the subject in front of a display apparatus. Regarding this, there is a known imaging system (Japanese Patent Laid-Open No. 2024-006362) that outputs a moire alert and prompts for the re-setting of imaging conditions (camera position and camera path) when moire is determined to have occurred.

SUMMARY

The present technology provides an imaging system, a control apparatus, an image capture apparatus, a control method, and a storage medium for adaptively reducing the effects of moire.

The present disclosure in its first aspect provides an imaging system comprising: an image capture apparatus configured to capture an image of a display apparatus with a pixel structure; and a control apparatus configured to control operation of the image capture apparatus, wherein the image capture apparatus includes: an imaging unit, and a filter unit configured to be applied to the imaging unit and configured with changeable filter characteristics, and the control apparatus includes: at least one processor and/or circuit, and at least one memory storing computer program, which causes the at least one processor and/or circuit to function as following units: an obtaining unit configured to obtain information of an imaging condition of the image capture apparatus; an estimating unit configured to output an estimation result of estimating whether or not moire will occur in a captured image output by the imaging unit, based on the information of the imaging condition; and a control unit configured to change the filter characteristics of the filter unit according to the estimation result.

The present disclosure in its second aspect provides a control apparatus configured to control operation of an image capture apparatus configured to capture an image of a display apparatus with a pixel structure, the image capture apparatus including an imaging unit and a filter unit configured to be applied to the imaging unit and configured with changeable filter characteristics, the control apparatus comprising: at least one processor and/or circuit; and at least one memory storing computer program, which causes the at least one processor and/or circuit to function as following units: an obtaining unit configured to obtain information of an imaging condition of the image capture apparatus; an estimating unit configured to output an estimation result of estimating whether or not moire will occur in a captured image output by the imaging unit on a basis of the information of the imaging condition; and a control unit configured to change the filter characteristics of the filter unit according to the estimation result.

The present disclosure in its third aspect provides an image capture apparatus configured to capture an image of a display apparatus with a pixel structure, comprising: an imaging unit; a filter unit configured to be applied to the imaging unit and configured with changeable filter characteristics; at least one processor and/or circuit; and at least one memory storing computer program, which causes the at least one processor and/or circuit to function as following units: an obtaining unit configured to obtain information of an imaging condition of the image capture apparatus; an estimating unit configured to output an estimation result of estimating whether or not moire will occur in a captured image output by the imaging unit on a basis of the information of the imaging condition; and a control unit configured to change the filter characteristics of the filter unit according to the estimation result.

The present disclosure in its fourth aspect provides a control method for controlling operation of an image capture apparatus configured to capture an image of a display apparatus with a pixel structure, the image capture apparatus including an imaging unit and a filter unit configured to be applied to the imaging unit and configured with changeable filter characteristics, the control method comprising: obtaining information of an imaging condition of the image capture apparatus; outputting an estimation result of estimating whether or not moire will occur in a captured image output by the imaging unit on a basis of the information of the imaging condition; and changing the filter characteristics of the filter unit according to the estimation result.

The present disclosure in its fifth aspect provides a computer-readable storage medium storing a program that causes a computer to carry out the control method according to the fourth aspect when the program is executed by the computer.

Features of the present disclosure will become apparent from the following description of embodiments with reference to the attached drawings. The following description of embodiments are described by way of example.

BRIEF DESCRIPTION OF THE DRAWINGS

The accompanying drawings, which are incorporated in and constitute a part of the specification, illustrate embodiments of the present disclosure, and together with the description, serve to explain the principles of the embodiments.

DESCRIPTION OF THE EMBODIMENTS

First Embodiment

Figure 1:
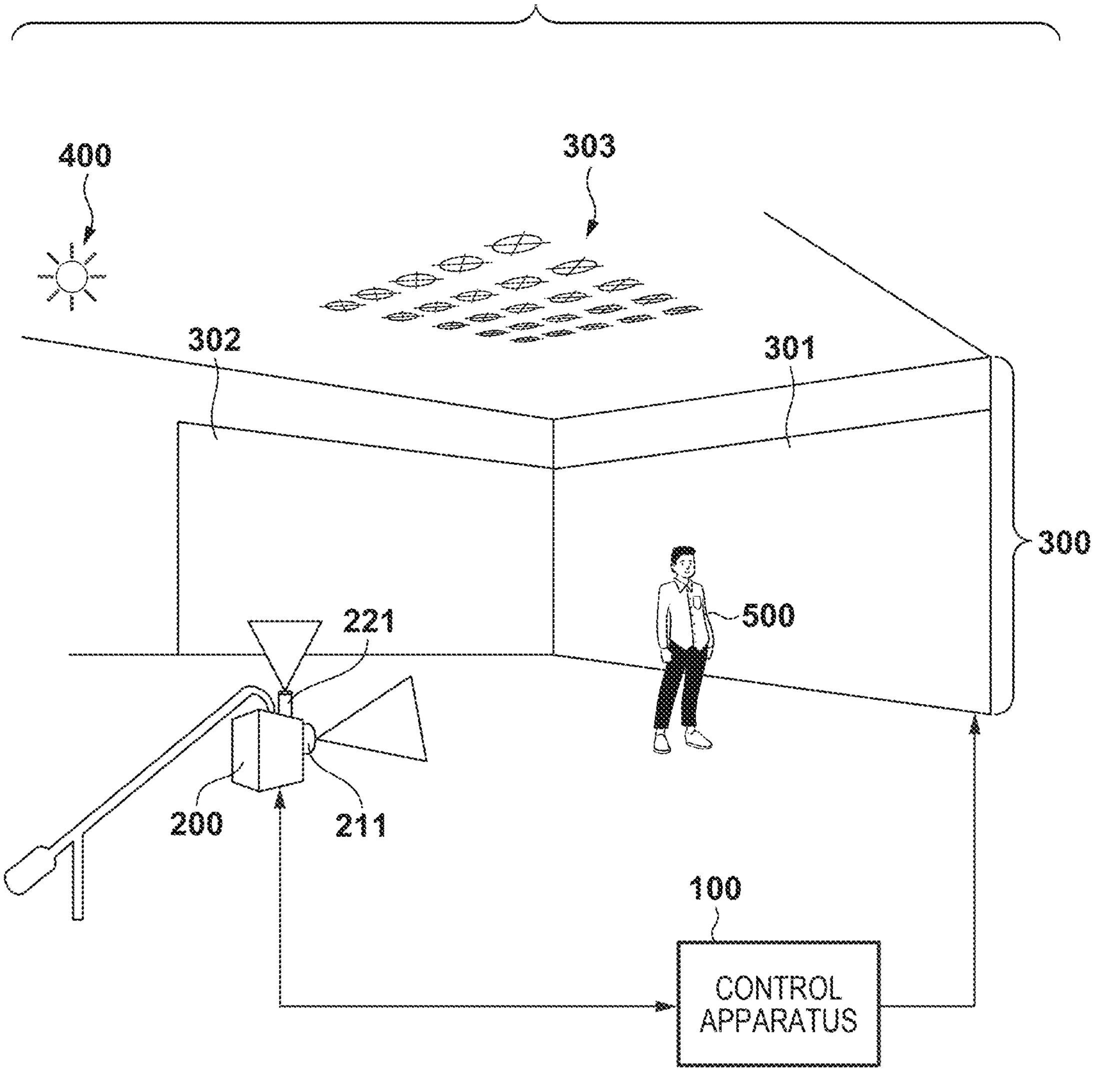
FIG. 1 is a diagram illustrating an example of the configuration of an imaging system according to embodiments and modified examples of the present technology.

Hereinafter, embodiments will be described in detail with reference to the attached drawings. Note, the following embodiments are not intended to limit the scope of the claims. Multiple features are described in the embodiments, but it is not the case that all such features are required, and multiple such features may be combined as appropriate. Furthermore, in the attached drawings, the same reference numerals are given to the same or similar configurations, and redundant description thereof is omitted.

The embodiment described below is an example of the present technology being applied to an imaging system, as an example of an imaging system, that includes an image capture apparatus, a display apparatus, and a control apparatus for controlling these apparatuses provided in an imaging studio configured for virtual production. However, the present technology can be applied to any system or device that can image a subject with a large display apparatus displaying a background video as the background.

Configuration of Imaging System

FIG. 1 illustrates an example of the configuration of an imaging studio using an imaging system according to the present embodiment.

In an imaging studio such as that illustrated, a subject 500 placed in front of a display apparatus 300 (on the side of the display apparatus 300 closer to an image capture apparatus 200) formed as a large LED wall is imaged by the image capture apparatus 200. With virtual production technology, a video (background video) according to the desired scene is displayed on the display apparatus 300, and the image capture apparatus 200 images the subject 500 together with the background video. Accordingly, the image capture apparatus 200 can directly record video that looks like the subject 500 is actually in the desired scene. In other words, with virtual production, the processing after image capture can be simplified more than previous methods such as chroma key compositing in which the subject 500 is placed in front of a screen of a predetermined color and a subject region is extracted from each frame of the captured video and composited with a background video.

The background video displayed on the display apparatus 300 is generated as computer graphics (CG), for example, so that changes to the look of the background in accordance with the position of the image capture apparatus 200 can be expressed. Specifically, the background video is generated by placing a background object in a three-dimensional space and rendering the three-dimensional space from a viewpoint that is in sync with the position and orientation of the image capture apparatus 200.

Thus, in the imaging system, the position and orientation of the image capture apparatus 200 are configured to be detectable. In the imaging system according to the present embodiment, the detection method applied includes the image capture apparatus 200 imaging a viewpoint detection marker 303 provided at a discretionary position in the imaging studio and the position and orientation of the image capture apparatus 200 being derived on the basis of the image of the marker shown in the captured image. Here, the viewpoint detection marker 303 is preferably not imaged together with the subject 500 and the display apparatus 300. Accordingly, in the example of FIG. 1, the viewpoint detection marker 303 is provided on the ceiling of the imaging studio. Thus, the image capture apparatus 200 is provided with a first imaging optical system 211 for imaging the subject 500 and the display apparatus 300 as well as a second imaging optical system 221 for capturing mainly the ceiling of the imaging studio.

In the example of FIG. 1, the display apparatus 300 includes an LED wall 301 and an LED wall 302. In some modes, the LED wall 301 is for display of a background video within the imaging field of view of the image capture apparatus 200, and the LED wall 302 is for display of a background video for reflection (reflection expression) on the subject 500 or an object placed as the foreground. Different applications may also be used. In this mode, the LED wall 302 can be a display apparatus with a lower display resolution than the LED wall 301.

Also, in the imaging studio, a lighting device 400 for illuminating the subject 500 depending on the scene in accordance with the background video is provided. In the present embodiment described herein, generating the background video to be displayed on the display apparatus 300, detecting the position and orientation of the image capture apparatus 200, and lighting control of the lighting device 400 are performed by a control apparatus 100. Also, the control apparatus 100 according to the present embodiment also controls the operations of the image capture apparatus 200. This will be described in more detail later.

Configuration of Control Apparatus 100

Figure 2:
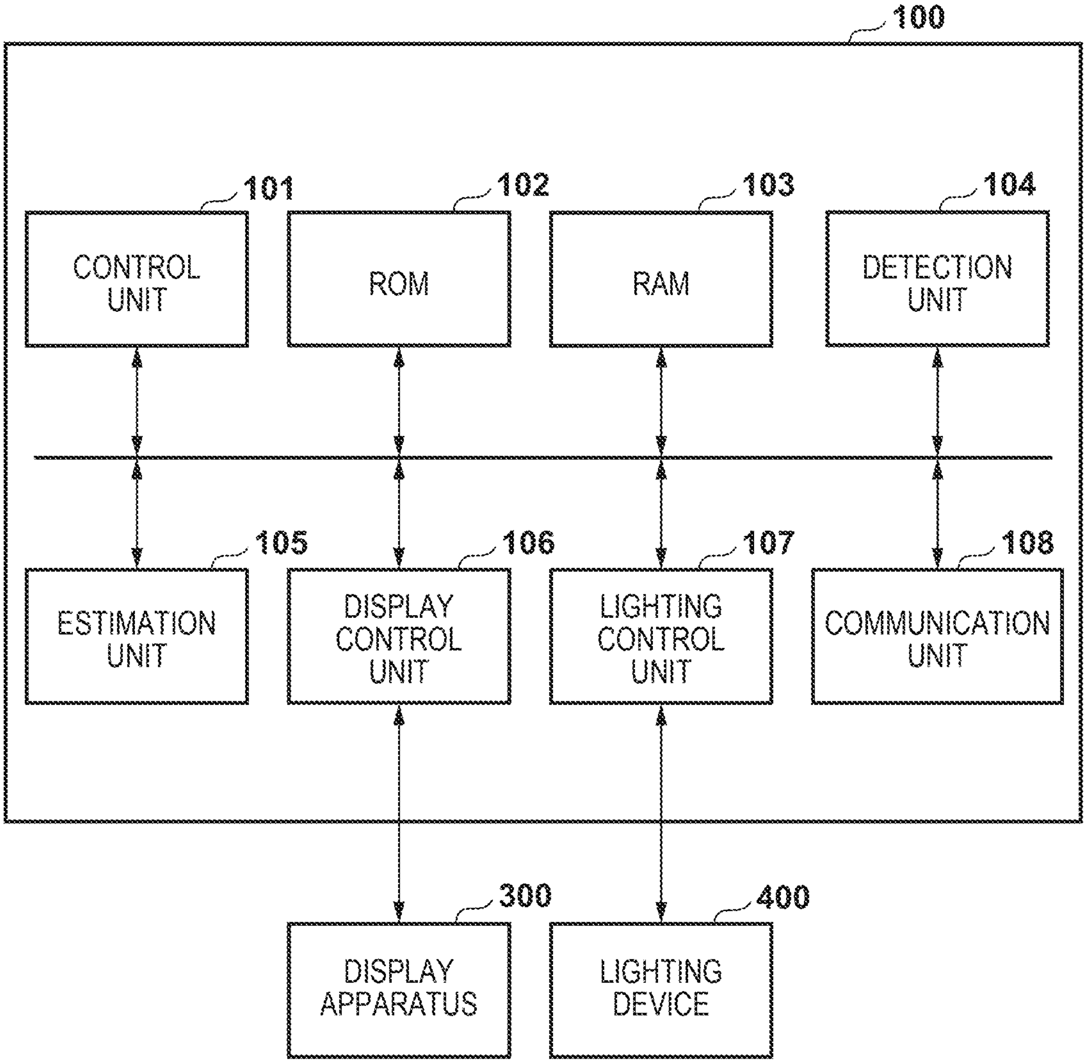
FIG. 2 is a block diagram illustrating an example of the functional configuration of a control apparatus 100 according to embodiments and modified examples of the present technology.

Here, the functional configuration of the control apparatus 100 will be described with reference to the block diagram of FIG. 2.

A control unit 101 is a control apparatus such as a CPU or the like that controls the operations of each block provided in the control apparatus 100. To control the operations of each block, for example, the control unit 101 reads out an operation program for each block stored in ROM 102, loads the program on RAM 103, and executes the program.

The ROM 102 is a non-volatile storage apparatus. The ROM 102 stores the operation programs of each block of the control apparatus 100 as well as information such as the parameters required for the operations of each block. The RAM 103 is a volatile storage apparatus. The RAM 103 is used as a loading area for the operation program of each block as well as a storage area for temporarily storing intermediate data or the like output by the operations of each block.

A detection unit 104 detects the position and orientation of the image capture apparatus 200. The detection unit 104 extracts an image corresponding to the viewpoint detection marker 303 from an image (hereinafter referred to as an image for detection) captured by the image capture apparatus 200 using the second imaging optical system 221 and detects the position and orientation of the image capture apparatus 200 on the basis of the state of the image.

An estimation unit 105 estimates whether or not moire will occur in the image (hereinafter referred to simply as a captured image) captured by the image capture apparatus 200 using the first imaging optical system 211. In the imaging system according to the present embodiment, since the image capture apparatus 200 images the subject 500 and the display apparatus 300 with a pixel structure using the first imaging optical system 211, depending on the imaging conditions, moire may occur in the captured image. This will be described below in detail. Accordingly, the estimation unit 105 estimates whether or not moire will occur in the captured image on the basis of the information of the imaging conditions according to the image capture apparatus 200 and outputs an estimation result.

A display control unit 106 controls the display of the background video on the display apparatus 300. The display control unit 106 includes a rendering apparatus such as a GPU, for example. The display control unit 106 generates each frame of the background video by rendering a three-dimensional space according to a predetermined scene on the basis of the viewpoint in accordance with the position and orientation of the image capture apparatus 200 detected by the detection unit 104.

A lighting control unit 107 controls the lighting state of the lighting device 400. As described above, the lighting state of the lighting device 400 is controlled in accordance with the scene being captured that corresponds to the background video. In some modes, the lighting control unit 107 may reference the result of detection by the detection unit 104 in the control of the lighting state.

A communication unit 108 is a communication interface provided in the control apparatus 100. Via the communication unit 108, the control apparatus 100 can exchange information with the image capture apparatus 200, the display apparatus 300, the lighting device 400, and similar external apparatuses via a network (not illustrated).

Configuration of Image Capture Apparatus 200

Figure 3:
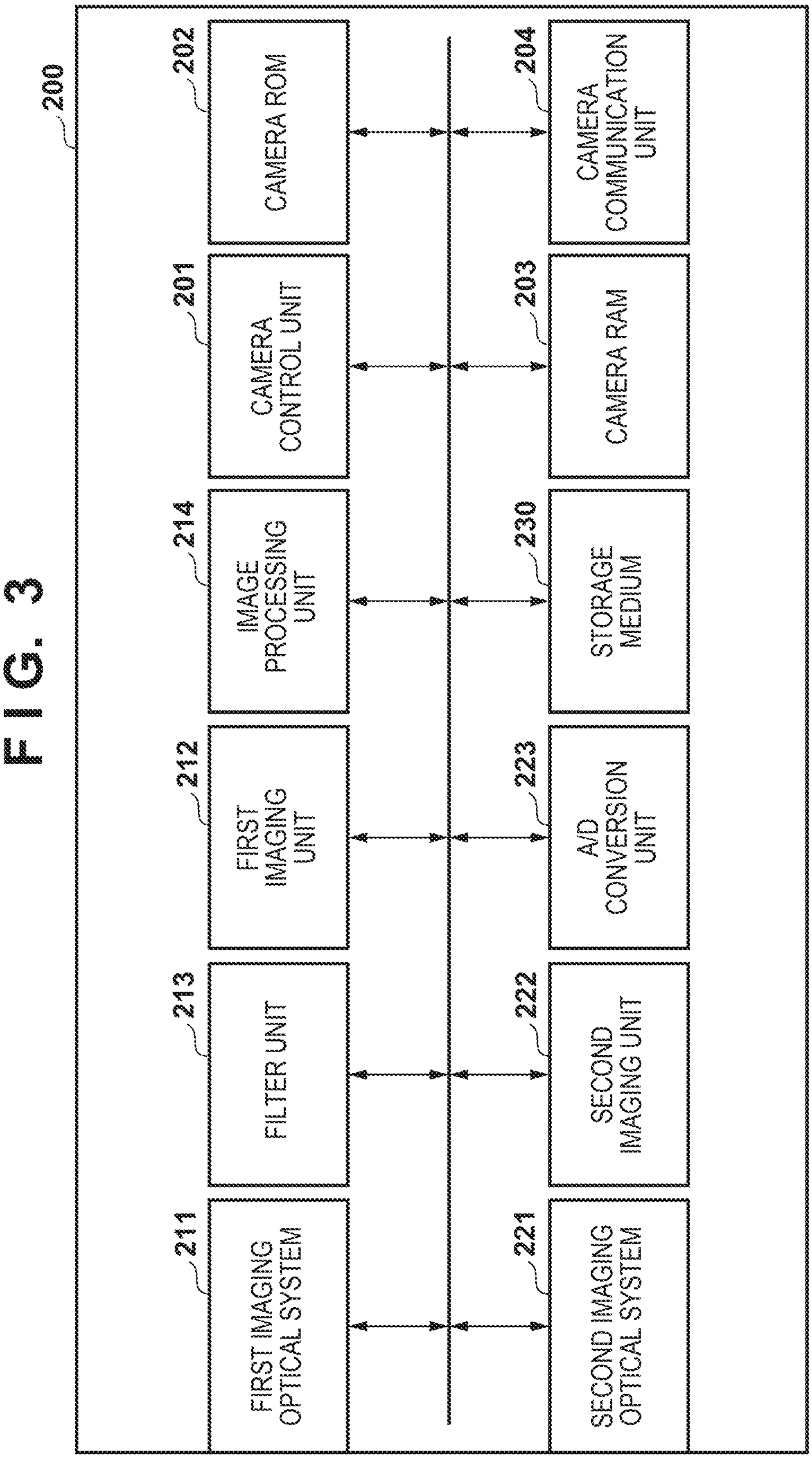
FIG. 3 is a block diagram illustrating an example of the functional configuration of an image capture apparatus 200 according to embodiments and modified examples of the present technology.

Next, the functional configuration of the image capture apparatus 200 will be described with reference to the block diagram of FIG. 3.

A camera control unit 201 is a control apparatus that controls the operations of each block provided in the image capture apparatus 200. To control the operations of each block, for example, the camera control unit 201 reads out an operation program for each block stored in camera ROM 202, loads the program on camera RAM 203, and executes the program.

The camera ROM 202 is a non-volatile storage apparatus. The camera ROM 202 stores the operation programs of each block of the image capture apparatus 200 as well as information such as the parameters required for the operations of each block. The camera RAM 203 is a volatile storage apparatus. The camera RAM 203 is used as a loading area for the operation program of each block as well as a storage apparatus for temporarily storing intermediate data or the like output by the operations of each block.

A camera communication unit 204 is a communication interface provided in the image capture apparatus 200. Via the camera communication unit 204, the image capture apparatus 200 can exchange information with the control apparatus 100 and similar external apparatuses via a network (not illustrated).

As described above, the image capture apparatus 200 is configured to execute both imaging using the first imaging optical system 211 and imaging using the second imaging optical system 221 and thus includes both a first imaging unit 212 and a second imaging unit 222.

The first imaging unit 212 is an image capture apparatus such as a CCD, a CMOS sensor, or the like. The first imaging unit 212 obtains an image signal according to the captured image by performing photoelectric conversion of an optical image formed on an imaging plane via the first imaging optical system 211. The first imaging optical system 211 includes a lens group including a zoom lens and the like. The first imaging optical system 211 is a replaceable imaging lens. In other words, the image capture apparatus 200 is configured to be installed with various types of imaging lens as the first imaging optical system 211. The captured image obtained by the first imaging unit 212 is output to an image processing unit 214, and various types of image processing is applied to it. For example, A/D conversion processing, development processing, white balance processing, and similar processing can be performed on the image signal at the image processing unit 214. The captured image obtained by the first imaging unit 212 is made a frame of a video for recording capturing the subject 500 with the background video displayed in the image capture apparatus 200 as the background. Accordingly, the captured images obtained during image capture are subjected to various types of image processing by the image processing unit 214 before being sequentially output and stored in a storage medium 230 as data of a frame of the video for recording.

Figure 4A:
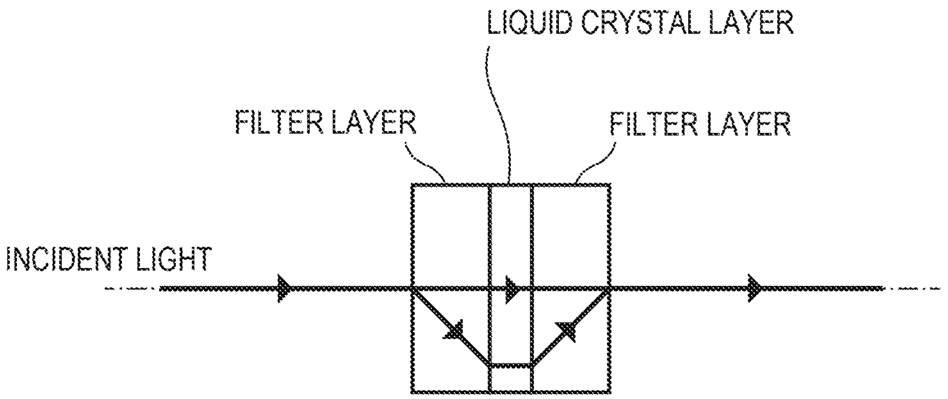
FIG. 4A is a diagram illustrating an example of a mode of a filter unit 213 according to embodiments and modified examples of the present technology.
Figure 4B:
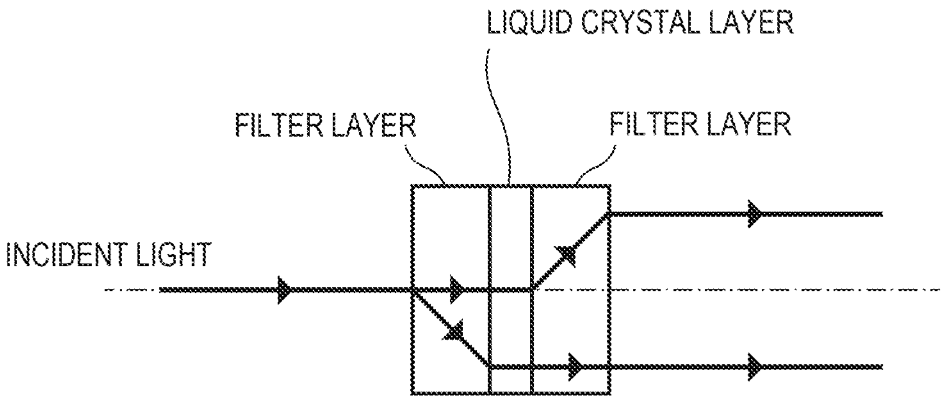
FIG. 4B is a diagram illustrating an example of a mode of the filter unit 213 according to embodiments and modified examples of the present technology.

Note that the image capture apparatus 200 according to the present embodiment includes a filter unit 213 configured to control whether to apply a filter on a region basis. The filter unit 213 according to the present embodiment is disposed between the first imaging optical system 211 and the first imaging unit 212 and is configured to be able to apply or not apply a filter per region with respect to a light beam incident via the first imaging optical system 211. For example, the filter unit 213 can apply an optical variable low-pass filter that can change the filter characteristics on a region basis via the applied voltage. As illustrated in FIG. 4A, the optical variable low-pass filter typically allows an incident light associated with one region to pass through to focus on one pixel associated with the region. On the other hand, as illustrated in FIG. 4B, when the filter effect is on, the optical variable low-pass filter allows the incident light to pass to separate and focus on a plurality of pixels. With such variable filter characteristics, the filter unit 213 can blur the image of any region of the captured image.

The second imaging unit 222 is an image capture apparatus such as a CCD, a CMOS sensor, or the like. The second imaging unit 222 obtains an image signal according to the captured image by performing photoelectric conversion of an optical image formed on an imaging plane via the second imaging optical system 221. The captured image obtained by the second imaging unit 222 is output to an A/D conversion unit 223 where A/D conversion processing is applied before being output as a digital image signal (image for detection). The image for detection obtained by the A/D conversion unit 223 is transmitted to the control apparatus 100 via the camera communication unit 204 and used in the detection processing for the position and orientation of the image capture apparatus 200 by the detection unit 104.

Overview of Filter Control

In the video recorded by the virtual production, the display apparatus 300 displaying the background video needs to be configured so that the display apparatus itself is not recognized. Based on this, basically, so that an image of the display pixel of the display apparatus 300 formed in the first imaging unit 212 is smaller than 1 pixel of the image sensor (hereinafter referred to as an imaging pixel), the position of the image capture apparatus 200 and the imaging magnification that can be applied in the imaging studio are restricted. Also, a restriction is placed on the standing position of the subject 500 and the like so that the display apparatus 300 is not focused on.

However, from the perspective of enabling image capture with high flexibility, there is a certain demand to be able to flexibly change the standing position of the subject 500 and the composition of the image capture apparatus 200 imaging the subject 500. However, if these changes are allowed, there is a possibility that the restrictions described above will no longer be guaranteed. As a result, if the display apparatus 300 is included in the depth of field, the following problems can be expected.

As described above, since the display apparatus 300 according to the present embodiment has a pixel structure, in image capture using the first imaging optical system 211, an image of the display apparatus 300 may form on the image sensor as a pattern with regular gaps. At this time, regarding a pattern indicating a frequency greater than the Nyquist frequency of the image sensor, suitable sampling (image capture) cannot be performed, leading to aliasing occurring and a pattern (moire) not intended appearing in the captured image. In a case where moire occurs in the captured image, there is a possibility of the video for recording giving an unnatural feel due to a degradation of image quality, giving the viewer the impression simply that image capture is performed in front of a display apparatus such as an LED wall, and the like.

On the other hand, according to studies conducted by the inventors, a process of repeatedly performing preliminary image capture and determining whether or not moire has occurred until an imaging condition that does not produce moire is set such as that described in Japanese Patent Laid-Open No. 2024-006362 is too involved. Also, even with imaging conditions that may produce moire, depending on the state of the subject, there is a possibility that the image taker desires to capture an image and the image capture being inhibited by an alert is not preferable.

Thus, in the imaging system according to the present embodiment, the estimation unit 105 of the control apparatus 100 estimates whether or not moire will occur on the basis of the information of the imaging conditions, and, in a case where moire is estimated to occur, control is performed to enable the optical low-pass filter to stop moire from occurring. Specifically, in a case where an estimation result indicating that moire will occur is obtained by the estimation unit 105, the control unit 101 outputs a control signal to cause a change in the filter characteristics of the filter unit 213 of the image capture apparatus 200 via the communication unit 108.

Figure 5A:
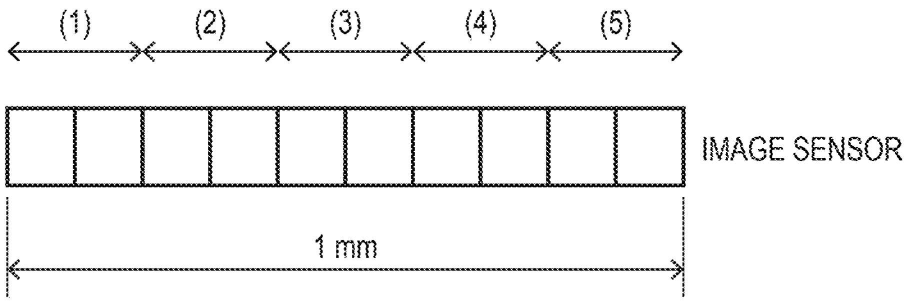
FIG. 5A is a diagram for describing the occurrence of moire according to embodiments and modified examples of the present technology.

Here, the Nyquist frequency of the image sensor will be described with reference to FIG. 5A. FIG. 5A illustrates imaging pixels arranged in the horizontal direction of the image sensor of the first imaging unit 212 in a range of 1 mm. In the illustrated example, ten imaging pixels are arranged in the horizontal direction per 1 mm. In such a case, the maximum number of lines arranged in the horizontal direction that can be resolved and recorded is, in a case where a line is formed every second pixel, is 5 lines per 1 mm. Accordingly, the Nyquist frequency of the image sensor is 5 lines/mm (or lp/mm, where lp is line pairs).

Figure 5B:
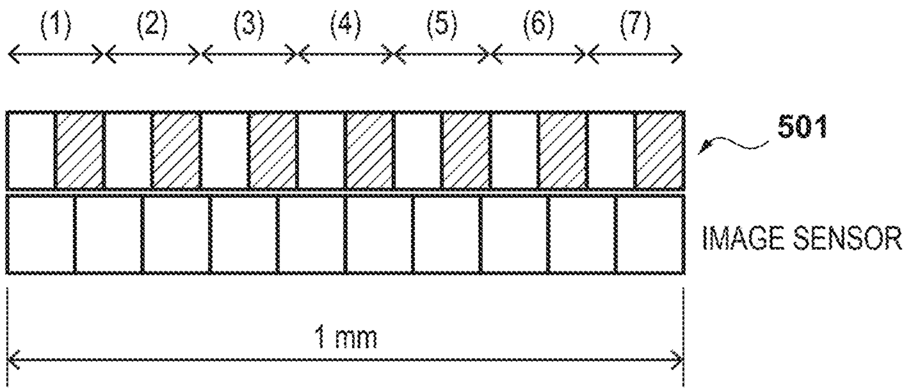
FIG. 5B is a diagram for describing the occurrence of moire according to embodiments and modified examples of the present technology.

Also, the frequency according to the image of the display apparatus 300 is represented by an image of the pixel structure of the display apparatus 300 that is formed in the first imaging unit 212 via the first imaging optical system 211. FIG. 5B illustrates an example of an image 501 of display pixels arranged in the horizontal direction forming the display apparatus 300 formed on the image sensor of the first imaging unit 212. As illustrated, the size of the image of one display pixel is less than the size of a single imaging pixel, guaranteeing that the display pixel will not appear in a visible state in the captured image. In the illustrated example, 14 display pixels are arranged in the horizontal direction per 1 mm, and the frequency showing the image of the pixel structure of the display apparatus 300 is 7 (lines/mm). In such a case, the frequency showing the image of the pixel structure is greater than the Nyquist frequency of the image sensor. Thus, even with sampling (image capture), aliasing occurs and appears as moire.

Note that the frequency showing the image of the pixel structure of the display apparatus 300 may change depending on the arrangement relationship between the image capture apparatus 200 and the display apparatus 300, the pitch (pixel interval) of the display pixels in the display apparatus 300, and the focal length set for the first imaging optical system 211. In other words, the image of the display pixels increases in size when the image capture apparatus 200 is closer to the display apparatus 300 and when the focal length set for the first imaging optical system 211 is longer. Accordingly, the estimation unit 105 references the information indicating the relative position of the display apparatus 300 to the image capture apparatus 200 and the information of the focal length set for the first imaging optical system 211 as necessary when estimating whether or not moire will occur. In some modes, the relative position of the display apparatus 300 to the image capture apparatus 200 can be identified on the basis of the position and orientation of the image capture apparatus 200 detected by the detection unit 104 due to the arrangement of the display apparatus 300 in the imaging studio being known.

Identifying Moire Occurrence Region

Also, enabling the filter unit 213 reduces the sharpness of the video. Thus, control is preferably performed so that it is enabled only for regions estimated to have moire occur and not the entire region of the image sensor. Accordingly, the estimation unit 105 identifies a region in the captured image where moire may occur on the basis of the following conditions.

First, the estimation unit 105 determines whether or not the display apparatus 300 is included in the depth of field of the first imaging optical system 211. As described above, moire occurs in a condition where the frequency showing the image of the pixel structure of the display apparatus 300 is greater than the Nyquist frequency of the image sensor.

However, if the display pixel is not included in the depth of field, in any case, the image of the display pixel will be formed in a blurred state. This means that a pattern with gaps will not appear. Accordingly, of the regions in the captured image showing the image of the display apparatus 300, regions included in the depth of field of the first imaging optical system 211 are extracted as the target region by the estimation unit 105, and a region where moire may occur is identified from these regions. In other words, the estimation unit 105 according to the present embodiment treats the image of the display apparatus 300 distributed in regions not included in the depth of field of the first imaging optical system 211 as non-target regions for the determination of whether or not moire will occur.

The depth of field of the first imaging optical system 211 can be determined on the basis of information including the f-number and the focal length set for the first imaging optical system 211. In the present embodiment, the information of the f-number and the focal length set for the first imaging optical system 211 in the image capture apparatus 200 is transmitted as required to the control apparatus 100 as the information of the imaging conditions, and the estimation unit 105 can reference the information.

Next, the estimation unit 105 derives the frequency showing the image of the pixel structure of the display apparatus 300 in the target region extracted as a region included in the depth of field. Then, the estimation unit 105 estimates whether or not the image distributed in the target region will cause moire to occur on the basis of the frequency showing the image of the pixel structure. The depth of field can change depending on the imaging conditions. Thus, the frequency showing the image of the pixel structure may be derived for each position in the target region according to the position in the target region. In a case where the frequency showing the image of the pixel structure derived in this manner is greater than the Nyquist frequency, the estimation unit 105 identifies the region as a region where moire may occur.

On the other hand, whether the pixel structure of the display apparatus 300 can be resolved changes depending on the performance (resolution limit) of the first imaging optical system 211. As described above, the first imaging optical system 211 is a replaceable imaging lens, and various lenses means various resolution limits. The resolution limit of the first imaging optical system 211 indicates how fine the resolution detail can be in an optical image formed on an imaging plane of an image sensor via the optical system and specifically indicates how many fine (black and white) lines can be reproduced in 1 mm on the image sensor. In other words, even if the derived frequency showing the image of the pixel structure of the display apparatus 300 is high, if it is greater than the resolution limit (unit: lines/mm) of the first imaging optical system 211, in any case, the gaps between the display pixels will be blurred when formed on the image sensor via the first imaging optical system 211. In other words, if the frequency theoretically indicated by the image of the pixel structure of the display apparatus 300 for any region is greater than the resolution limit of the first imaging optical system 211, the pixel structure will not be resolved in that region. Thus, it can be determined that moire will not occur.

Thus, the estimation unit 105 according to the present embodiment identifies, from among the target regions, a region with a frequency showing the image of the pixel structure of the display apparatus 300 that is greater than the Nyquist frequency of the image sensor and less than the frequency of the resolution limit of the first imaging optical system 211 as a region where moire may occur. The estimation unit 105 outputs the information of the region where moire may occur identified in this manner as an estimation result, and the control unit 101 transmits a control signal for enabling the filter unit 213 of the region on the basis of the information of the estimation result to the image capture apparatus 200.

Note that the information of the resolution limit of the imaging lens may change depending on the set focal length and f-number (blurring due to aberration on the open aperture side and blurring due to a diffraction effect on the small aperture side) even if within the depth of field, but a reference value is provided by the manufacturing source of the imaging lens, for example. Accordingly, the information of the imaging conditions transmitted from the image capture apparatus 200 to the control apparatus 100 may include identification information for identifying the first imaging optical system 211 installed in the image capture apparatus 200. In this mode, the information of the resolution limit for each imaging lens is pre-registered in the ROM 102, for example, and the estimation unit 105 can obtain the information of the resolution limit of the first imaging optical system 211 on the basis of the identification information.

In this manner, a region where moire may occur can be identified on the basis of information including the positional relationship between the image capture apparatus 200 and the display apparatus 300 and the imaging conditions. However the filter unit 213 does not need to be enabled for the entire region. In other words, in image capture in the imaging studio, it is assumed that the subject 500 is included in the imaging field of view. Thus, if the filter unit 213 is enabled for the region where the subject 500 is distributed (hereinafter referred to as a subject region) as well, video in which the subject is unclear is captured. Thus, the estimation unit 105 excludes the subject region in the identification of regions where moire may occur in the captured image. In the present embodiment described herein, the captured image obtained according to the first imaging optical system 211 is transmitted to the control apparatus 100, and the estimation unit 105 detects a subject region on the basis of the image. When the subject region is detected in this manner, the estimation unit 105 performs control so that a region excluding the subject region in the captured image is set as the region in the identification of regions where moire may occur. In this manner, even if the estimation unit 105 outputs an estimation result indicating the moire may occur, as a result of the control by the control unit 101, the filter unit 213 is disabled (not enabled) with respect to the subject region.

To summarize, the estimation unit 105 extracts regions, excluding the subject region, showing the display apparatus 300 included in the depth of field as the target regions. Then, the estimation unit 105 identifies, from among the target regions, a region with a frequency showing the image of the pixel structure of the display apparatus 300 that is within the range of the frequency of the resolution limit of the first imaging optical system 211 from the Nyquist frequency of the image sensor as a region where moire may occur.

Control Processing

Figure 6:
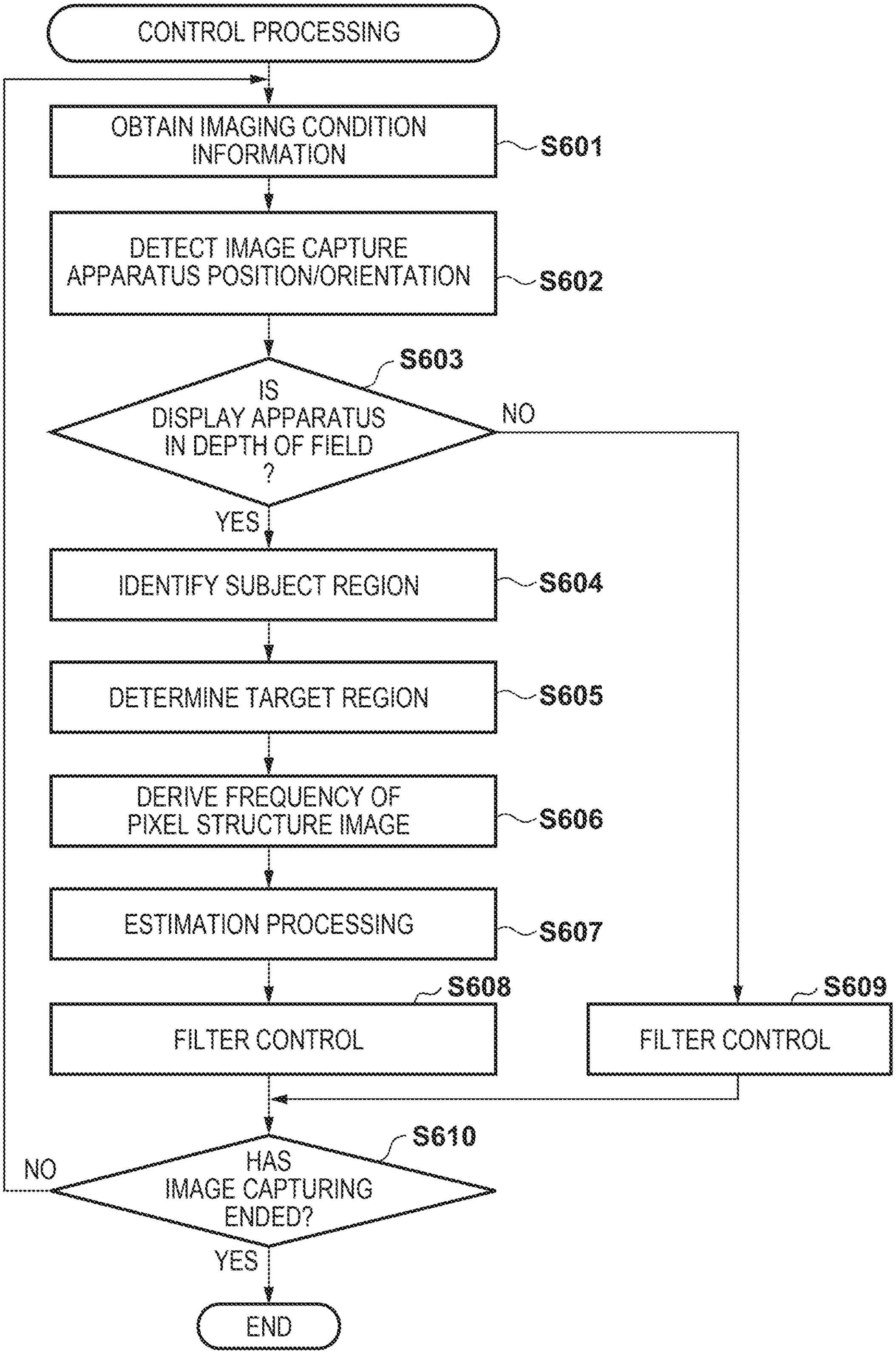
FIG. 6 is a flowchart illustrating an example of control processing executed in the control apparatus 100 according to embodiments and modified examples of the present technology.

Control processing executed according to the operation control of the filter unit 213 in the control apparatus 100 according to the present embodiment will be described in detail below using the flowchart of FIG. 6. The processing corresponding to the flowchart can be implemented by the control unit 101 reading out the corresponding processing programs stored in the ROM 102, for example, loading them onto the RAM 103, and executing them. The present control processing described herein is started, for example, when an operation relating to moving image capture is input in the image capture apparatus 200 and processing relating to moving image capture is executed on the basis of the operation input.

In step S601, the control unit 101 obtains information of the imaging conditions currently set in the image capture apparatus 200. In the present embodiment, for example, the camera control unit 201 periodically outputs the information of the imaging conditions set in the image capture apparatus 200 to the control apparatus 100 via the camera communication unit 204. When the information of the imaging conditions output in this manner is obtained via the communication unit 108, the information is stored and held in the RAM 103. Accordingly, the RAM 103 stores the information of the imaging conditions currently set in the image capture apparatus 200. In the present step, the control unit 101 obtains the information of the imaging conditions currently set in the image capture apparatus 200 by reading out the information from the RAM 103.

In step S602, under the control of the control unit 101, the detection unit 104 detects the position and orientation of the image capture apparatus 200.

In step S603, under the control of the control unit 101, the estimation unit 105 determines whether or not the display apparatus 300 is included in the depth of field of the first imaging optical system 211. Specifically, the estimation unit 105 identifies the depth of field of the first imaging optical system 211 on the basis of the information of the position and orientation of the image capture apparatus 200 detected in step S602 and the information of the imaging conditions. Also, the estimation unit 105 determines whether the display apparatus 300 is included in the depth of field on the basis of the predetermined arrangement information of the display apparatus 300 in the imaging studio and the information of the position and orientation of the image capture apparatus 200. At this time, if the display apparatus 300 is included in the depth of field, the estimation unit 105 stores the information of the region (pixel position on the image sensor) on the captured image showing the image of the display apparatus 300 in the depth of field in the RAM 103 as information of the target region. In a case where the estimation unit 105 determines that the display apparatus 300 is included in the depth of field of the first imaging optical system 211, the processing moves to step S604. In a case where the estimation unit 105 determines that the display apparatus 300 is not included, the processing moves to step S609.

In step S604, under the control of the control unit 101, the estimation unit 105 identifies the subject region in the captured image. As with the information of the imaging conditions, in the present embodiment, the captured image obtained using the first imaging optical system 211 in the image capture apparatus 200 is periodically output to the control apparatus 100 via the camera communication unit 204. Thus, by executing subject detection processing on the captured image obtained via the communication unit 108, the estimation unit 105 obtains the information of the subject region in the captured image.

In step S605, under the control of the control unit 101, the estimation unit 105 determines the target region. Specifically, by excluding the subject region identified in step S604 from the target regions identified in step S603, the estimation unit 105 determines the target region using estimation processing of whether or not moire will occur.

In step S606, under the control of the control unit 101, the estimation unit 105 derives the frequency that the image of the pixel structure of the display apparatus 300 formed on the imaging pixel exhibits for each imaging pixel of the first imaging unit 212 distributed in the target region. Specifically, for each imaging pixel distributed in the target region, the estimation unit 105 obtains information including the distance between the portion of the display apparatus 300 corresponding to the pixel position and the image capture apparatus 200, the pixel pitch of the display apparatus 300, and the focal length set for the first imaging optical system 211. Then, the estimation unit 105 can derive the frequency showing the image of the pixel structure formed at the pixel position on the basis of this information.

In step S607, under the control of the control unit 101, the estimation unit 105 executes estimation processing to estimate whether or not moire will occur in the imaging pixel for each imaging pixel distributed in the target region. Via this estimation processing, the estimation unit 105 outputs an estimation result indicating whether or not moire will occur in the imaging pixel for each imaging pixel distributed in the target region. In the estimation processing according to the present embodiment, estimation is performed of whether or not the frequency showing the image of the pixel structure of the display apparatus 300 derived for each imaging pixel is within a range from the Nyquist frequency of the imaging pixel of the first imaging unit 212 to the frequency of the resolution limit of the first imaging optical system 211. In a case where the frequency showing the image of the pixel structure derived for the imaging pixel is included in the range described above, the estimation unit 105 outputs an estimation result indicating that moire will occur in the imaging pixel. Also, in a case where the frequency showing the image of the pixel structure derived for the imaging pixel is not included in the range described above, the estimation unit 105 outputs an estimation result indicating that moire will not occur in the imaging pixel.

In step S608, the control unit 101 controls the operation of the filter unit 213 on the basis of the estimation result of the estimation processing executed in step S607. Specifically, for an imaging pixel with an estimation result output indicating that moire will occur, the control unit 101 transmits a control signal for enabling the filter unit 213 at the corresponding position to the image capture apparatus 200 via the communication unit 108. Also, for an imaging pixel with an estimation result output indicating that moire will not occur or an imaging pixel determined as outside the target region, the control unit 101 transmits a control signal for disabling the filter unit 213 at the corresponding position (region) to the image capture apparatus 200 via the communication unit 108. Via this control signal, the camera control unit 201 can control the operation of the filter unit 213 and can reduce the high frequency component of the image formed at the imaging pixel estimated to have moire occur to blur the image.

On the other hand, in a case where the display apparatus 300 is determined to not be included in the depth of field of the first imaging optical system 211 in step S603, in step S609, the control unit 101 transmits a control signal to initialize the operation of the filter unit 213 to the image capture apparatus 200 via the communication unit 108. In the present embodiment, the filter unit 213 is configured to be disabled in the initial state (filter not applied), and the camera control unit 201 disables the filter for the entire region of the filter unit 213 via the initialization control signal.

In step S610, the control unit 101 determines whether or not moving image capture by the image capture apparatus 200 has ended. The determination of the present step can be performed on the basis of whether or not information relating to ending image capture sent in response to an operation input relating to ending moving image capture being made on the image capture apparatus 200 has been received by the communication unit 108. In a case where moving image capture by the image capture apparatus 200 is determined to have ended, the control unit 101 ends the present control processing. In a case where it is determined to have not ended, the processing returns to step S601.

As described above, according to the control apparatus of the present embodiment, the image capture apparatus 200 can be made to perform image capture with adaptively reduced moire effects. Specifically, the control apparatus 100 can perform control to enable the filter unit 213 for a region that is estimated to have moire occur and can cause the image capture apparatus 200 to perform image capture without degradation of image quality due to moire.

Note that to facilitate understanding of the technology, in the present embodiment described here, the control apparatus 100 performs detection of the position and orientation of the image capture apparatus 200, background video generation and display control, and filter unit 213 operation control. However, the embodiments of the present technology are not limited thereto. It is sufficient that the control apparatus 100 according to some embodiments of the present technology estimates whether or not moire will occur in a captured image output by the image capture apparatus 200 on the basis of imaging conditions information and controls the filter characteristics of the filter unit 213 on the basis of the estimation result. Accordingly, the detection of the position and orientation of the image capture apparatus 200 and the background video generation and display control may be performed by an external apparatus.

First Modified Example

In the embodiment described above, a mode is described in which the filter unit 213 is switched to enabled/disabled for each region in a captured image on the basis of the estimation result from the estimation unit 105. In other words, in the first embodiment described above, a mode is described in which a filter with fixed filter characteristics is uniformly applied to regions estimated to have moire occur. However, the embodiments of the present technology are not limited thereto.

As described above, the frequency showing the image of the pixel structure of the display apparatus 300 at the image sensor may change per region according to the distance between the display apparatus 300 and the image capture apparatus 200. In other words, in a case where a filter with fixed filter characteristics is uniformly applied, depending on the arrangement mode of the image capture apparatus 200 and the display apparatus 300, the background video of a certain region may be blurred too much, causing a video that gives an unnatural feel to the viewer to be recorded. Thus, in a mode in which the filter characteristics of the filter unit 213 can be changed per region, control may be performed so that the filter characteristics of the filter unit 213 to be applied to each region are adaptively changed according to the frequency showing the image of the pixel structure formed at the region.

Figure 7:
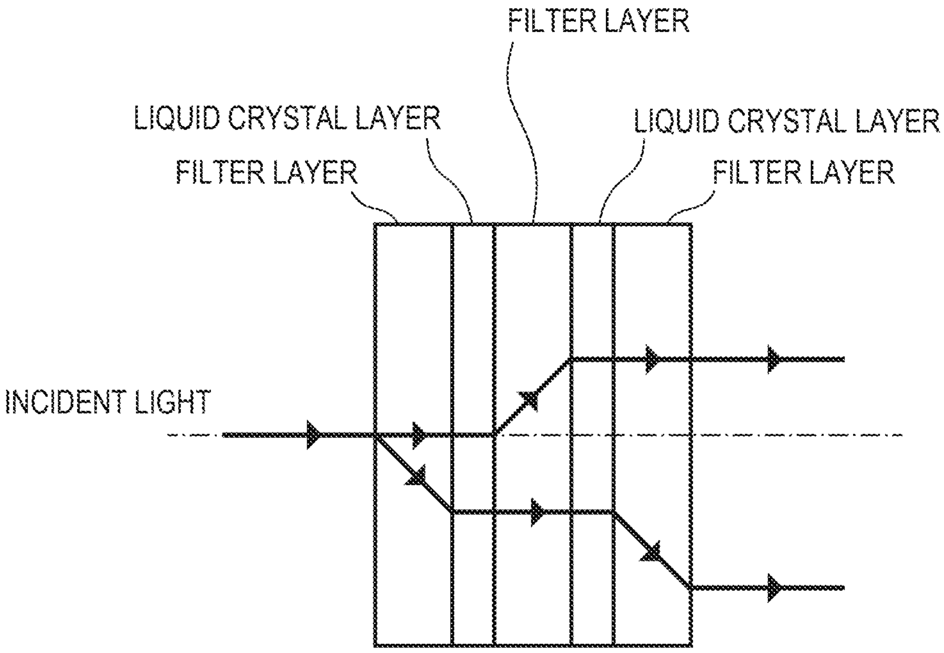
FIG. 7 is a diagram illustrating an example of a mode of the filter unit 213 according to a first modified example of the present technology.

As illustrated in FIG. 7, for example, the filter unit 213 with changeable filter characteristics can be implemented using a multi-layered structure in which a plurality of optical variable low-pass filters that can switch between enabled and disabled on a region basis are arranged in the optical axis direction. In such a case, for a region with an estimation result of moire will occur, the control unit 101 can change the filter characteristics by controlling whether to enable the optical variable low-pass filter of a layer depending on the frequency showing the image of the pixel structure according to the region. In other words, depending on the number optical variable low-pass filters enabled, the thickness of the filter can be changed. Thus, the filter characteristics can be adaptively changed. By giving the filter unit 213 a multilayer filter structure in this manner, the cut frequency band can be varied on a region basis. Thus, moire can be prevented from occurring, and the operation of the image capture apparatus 200 can be controlled to record video of a suitable image quality.

Note that the filter unit 213 with changeable filter characteristics on a region basis is not limited to being an optical variable low-pass filter, and naturally various filters can be used.

Second Modified Example

In the embodiment described above, a mode is described in which the filter unit 213 is enabled on the condition that the frequency showing the image of the pixel structure of the display apparatus 300 is within a range from the Nyquist frequency of the image sensor to the frequency of the resolution limit of the first imaging optical system 211. However, the embodiments of the present technology are not limited thereto. For example, for any region, the filter may be controlled to be enabled for the region on the condition that the frequency showing the image of the pixel structure formed at the region is greater than the Nyquist frequency of the image sensor. Alternatively, in a situation where, depending on the arrangement condition of the image capture apparatus 200 or the like, the frequency showing the image of the pixel structure of the display apparatus 300 is guaranteed to be greater than the Nyquist frequency of the image sensor, the filter unit 213 may be controlled by a comparison with the frequency of the resolution limit of the first imaging optical system 211. In such a case, for any region, for example, control may be performed to enable the filter for that region on the condition that the frequency showing the image of the pixel structure formed at the region is less than the frequency of the resolution limit of the first imaging optical system 211.

Third Modified Example

In the embodiment and modified examples described above, a mode is described in which the filter characteristics of the filter unit 213 can be changed (changeable between enabled and disabled) on a region basis. However, the embodiments of the present technology are not limited thereto. From the perspective of guaranteeing sharpness of the entire recorded video, it is better to enable the filter for only a region where moire may occur. However, a configuration with changeable filter characteristics on a region basis may increase the installation cost of the filter unit 213 and increase the amount of computations relating to control. Accordingly, the filter unit 213 is not necessarily configured with filter characteristics that are changeable on a region basis, and a configuration may be used that, in a case where an estimation result indicating that moire will occur is obtained, applies a filter to everything and not per region.

In such a case, by the filter unit 213 having changeable filter characteristics on the basis of the frequency showing the image of the pixel structure derived for a region where moire may occur, moire can be appropriately prevented according to the state of the image capture apparatus 200.

The filter unit 213 of such a mode is a sensor- (image sensor-) driven low-pass filter, for example. By the image sensor of the first imaging unit 212 being moved in a translating manner in a plane orthogonal to the optical axis, for each region, the sensor-driven low-pass filter can focus the light beam incident via the first imaging optical system 211 on imaging pixels different in a time-divisional manner and capture images to make them blurry. In other words, in a mode in which a sensor-driven low-pass filter is used as the filter unit 213, the filter unit 213 is not provided between the first imaging optical system 211 and the first imaging unit 212 and is instead installed as a mechanism for driving the first imaging unit 212. Note that since control of the filter characteristics is not performed according to the region in a case where a sensor-driven low-pass filter is used, processing to estimate whether or not moire will occur per imaging pixel, such as the control processing of the first embodiment described above, may not be executed.

Fourth Modified Example

In the embodiment described above, the distance between the image capture apparatus 200 and the display apparatus 300 derived on the basis of information of the detected position and orientation of the image capture apparatus 200 corresponds to the predetermined arrangement information of the display apparatus 300. However, the embodiments of the present technology are not limited thereto. For example, in a mode in which the image capture apparatus 200 is provided with a distance sensor or the image sensor of the first imaging unit 212 is configured to record a plurality of images for pupil division and perform distance measuring via the image-sensing plane phase difference distance measurement method, the information indicating the distance distribution in the depth direction obtained via distance measuring can be used. In such a mode, distance information is periodically output from the image capture apparatus 200, and the estimation unit 105 can derive the frequency showing the pixel structure of the display apparatus 300 formed at the first imaging unit 212 by referencing the distance information.

Fifth Modified Example

In the embodiment and modified examples described above, a mode is described in which, to detect the position and orientation of the image capture apparatus 200, the viewpoint detection marker 303 provided in the imaging studio uses the image for detection captured using the second imaging optical system 221. However, it should be obvious that the detection of the position and orientation and the image capture apparatus 200 can be performed via another method. In other words, in the embodiments of the present technology, the viewpoint detection marker 303 does not need to be placed and the image capture apparatus 200 does not need to include an imaging system including the second imaging optical system 221.

Second Embodiment

In the embodiment and modified examples described above, a mode is described in which the control apparatus 100 provided outside of the image capture apparatus 200 outputs a control signal according to the operation of the filter unit 213 and the camera control unit 201 controls the filter characteristics of the filter unit 213 on the basis of the control signal. However, the embodiments of the present technology are not limited thereto, and for example, the estimation unit 105 may be provided as the functional configuration of the image capture apparatus 200. In other words, in a mode in which the image capture apparatus 200 is configured to obtain information including the pixel pitch and the like of the display apparatus 300, the estimation unit provided in the image capture apparatus 200 estimates whether or not moire will occur in the captured image, and control of the filter unit 213 can be performed on the basis of this estimation result.

Sixth Modified Example

In the first embodiment described above, a mode is described in which, in a case where the frequency showing the image of the pixel structure of the display apparatus 300 is greater than the frequency of the resolution limit of the first imaging optical system 211, the estimation unit 105 estimates that moire will not occur in the region. However, the embodiments of the present technology are not limited thereto. For example, for each first imaging optical system 211 that can be installed in the image capture apparatus 200, a threshold for a frequency at which moire does not occur may be identified in advance with an experiment or the like, and this information may be used in the estimation. In other words, in step S607 of the control processing, it is sufficient that, on the condition that the frequency showing the image of the pixel structure of the display apparatus 300 is greater than the threshold described above determined for the first imaging optical system 211, the estimation unit 105 outputs an estimation result indicating the moire will not occur in the region.

Seventh Modified Example

To facilitate understanding of the technology, in the embodiments and modified examples described above, only the filter unit 213 is present as a filter in the imaging system associated with the first imaging optical system 211. However, the embodiments of the present technology are not limited thereto. For example, in a mode in which another filter is incorporated in the first imaging unit 212, in the control processing, the frequency of the resolution limit determined with a configuration other than the filter unit 213 included in the imaging system may be referenced instead of the resolution limit of the first imaging optical system 211.

With such a configuration, according to the present technology, the effects of moire can be adaptively reduced.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2024-107638, filed Jul. 3, 2024, which is hereby incorporated by reference herein in its entirety.

What is claimed is:

1. An imaging system comprising:
- an image capture apparatus configured to capture an image of a display apparatus with a pixel structure; and
- a control apparatus configured to control operation of the image capture apparatus, wherein
- the image capture apparatus includes:
  - an imaging unit, and
  - a filter unit configured to be applied to the imaging unit and configured with changeable filter characteristics, and
- the control apparatus includes:
  - at least one processor and/or circuit, and
  - at least one memory storing computer program, which causes the at least one processor and/or circuit to function as following units:
    - an obtaining unit configured to obtain information of an imaging condition of the image capture apparatus;
    - an estimating unit configured to output an estimation result of estimating whether or not moire will occur in a captured image output by the imaging unit, based on the information of the imaging condition; and
    - a control unit configured to change the filter characteristics of the filter unit according to the estimation result.

2. The imaging system according to claim 1, wherein
- the imaging unit includes an imaging optical system and an image sensor, and
- the estimating unit estimates whether or not moire will occur in a captured image, based on a frequency showing an image of the pixel structure of the display apparatus formed on the image sensor.

3. The imaging system according to claim 2, wherein
- the estimating unit outputs the estimation result indicating that moire will occur in a captured image on a condition that the frequency showing the image of the pixel structure is greater than a Nyquist frequency of the image sensor.

4. The imaging system according to claim 2, wherein
- the estimating unit outputs the estimation result indicating that moire will occur in a captured image on a condition that the frequency showing the image of the pixel structure is less than a frequency of a resolution limit of the imaging optical system.

5. The imaging system according to claim 2, wherein
- the estimating unit outputs the estimation result indicating that moire will occur in a captured image on a condition that the frequency showing the image of the pixel structure is greater than a Nyquist frequency of the image sensor and is less than a frequency of a resolution limit of the imaging optical system.

6. The imaging system according to claim 4, wherein
- the imaging unit is configured to be installed with the imaging optical system which include a plurality of types of imaging optical systems, and
- the frequency of the resolution limit of the imaging optical system is predetermined for each of the plurality of types of imaging optical systems.

7. The imaging system according to claim 2, wherein
- the information of the imaging condition includes information indicating a relative position of the display apparatus to the image capture apparatus and information of a focal length of the imaging optical system, and
- the estimating unit derives the frequency showing the image of the pixel structure, based on a distance between display pixels forming the display apparatus and the information of the imaging condition.

8. The imaging system according to claim 2, wherein
- the control unit controls the filter characteristics of the filter unit so that the frequency showing the image of the pixel structure is filtered.

9. The imaging system according to claim 2, wherein
- the filter unit is configured with changeable filter characteristics on a region of the image sensor basis,
- the estimating unit includes an identifying unit configured to identify a region in a captured image where moire is estimated to occur, and
- the control unit enables application of the filter unit on a region identified by the identifying unit.

10. The imaging system according to claim 9, wherein
- the information of the imaging condition includes information indicating a relative position of the display apparatus to the image capture apparatus and information of an f-number and focal length of the imaging optical system, and
- the estimating unit outputs the estimation result indicating that moire will occur in a captured image on a condition that the display apparatus is included in a depth of field of the imaging optical system.

11. The imaging system according to claim 10, wherein
- the identifying unit identifies a region where moire is estimated to occur from among regions in a captured image where an image of the display apparatus included in the depth of field is distributed.

12. The imaging system according to claim 9, wherein
- the computer program further causes the at least one processor and/or circuit to function as a detecting unit configured to detect a subject region where a subject in a captured image is distributed, and
- the control unit disables application of the filter unit on the subject region.

13. The imaging system according to claim 12, wherein
- the estimating unit, excluding the subject region, identifies a region in a captured image where moire is estimated to occur.

14. A control apparatus configured to control operation of an image capture apparatus configured to capture an image of a display apparatus with a pixel structure, the image capture apparatus including an imaging unit and a filter unit configured to be applied to the imaging unit and configured with changeable filter characteristics, the control apparatus comprising:

at least one processor and/or circuit; and at least one memory storing computer program, which causes the at least one processor and/or circuit to function as following units:

an obtaining unit configured to obtain information of an imaging condition of the image capture apparatus;

an estimating unit configured to output an estimation result of estimating whether or not moire will occur in a captured image output by the imaging unit on a basis of the information of the imaging condition; and a control unit configured to change the filter characteristics of the filter unit according to the estimation result.

15. An image capture apparatus configured to capture an image of a display apparatus with a pixel structure, comprising:

an imaging unit;

a filter unit configured to be applied to the imaging unit and configured with changeable filter characteristics;

at least one processor and/or circuit; and at least one memory storing computer program, which causes the at least one processor and/or circuit to function as following units:

an obtaining unit configured to obtain information of an imaging condition of the image capture apparatus;

an estimating unit configured to output an estimation result of estimating whether or not moire will occur in a captured image output by the imaging unit on a basis of the information of the imaging condition; and a control unit configured to change the filter characteristics of the filter unit according to the estimation result.

16. A control method for controlling operation of an image capture apparatus configured to capture an image of a display apparatus with a pixel structure, the image capture apparatus including an imaging unit and a filter unit configured to be applied to the imaging unit and configured with changeable filter characteristics, the control method comprising:

obtaining information of an imaging condition of the image capture apparatus;

outputting an estimation result of estimating whether or not moire will occur in a captured image output by the imaging unit on a basis of the information of the imaging condition; and changing the filter characteristics of the filter unit according to the estimation result.

17. A computer-readable storage medium storing a program that causes a computer to carry out the control method according to claim 16 when the program is executed by the computer.

* * * * *